US011700357B2

(12) United States Patent
Nakagawa (10) Patent No.: US 11,700,357 B2
(45) Date of Patent: Jul. 11, 2023

(54) CONNECTED CAMERA SYSTEM FOR VEHICLES

(71) Applicant: Toyota Motor Engineering & Manufacturing North America, Inc., Plano, TX (US)

(72) Inventor: Masashi Nakagawa, Sunnyvale, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 172 days.

(21) Appl. No.: 17/166,949

(22) Filed: Feb. 3, 2021

(65) Prior Publication Data

US 2022/0247976 A1    Aug. 4, 2022

(51) Int. Cl.
| | |
|---|---|
| *H04N 7/18* | (2006.01) |
| *H04N 5/38* | (2006.01) |
| *B60R 1/00* | (2022.01) |
| *B60W 60/00* | (2020.01) |
| *B60R 16/023* | (2006.01) |
| *H04W 4/46* | (2018.01) |
| *G06V 20/62* | (2022.01) |
| *G06V 20/58* | (2022.01) |
| *H04N 23/698* | (2023.01) |

(52) U.S. Cl.
CPC ............... *H04N 7/183* (2013.01); *B60R 1/00* (2013.01); *B60R 16/0231* (2013.01); *B60W 60/001* (2020.02); *G06V 20/584* (2022.01); *G06V 20/62* (2022.01); *H04N 5/38* (2013.01); *H04N 23/698* (2023.01); *H04W 4/46* (2018.02); *B60R 2300/10* (2013.01); *B60R 2300/20* (2013.01)

(58) Field of Classification Search
CPC ...... H04N 7/183; H04N 5/23238; H04N 5/38; H04N 5/23293; B60R 1/00; B60R 16/0231; B60R 2300/10; B60R 2300/20; B60R 2300/50; B60R 1/22; B60R 1/23; B60R 1/24; B60R 1/25; B60R 1/26; B60R 1/27; B60R 1/28; B60R 2300/102; B60R 2300/101; B60R 2300/103; B60R 2300/105; B60R 2300/106; B60R 2300/107; B60W 60/001; G06V 20/584; G06V 20/62; G06V 20/588; H04W 4/46
USPC .......................................................... 348/148
See application file for complete search history.

(56) References Cited

U.S. PATENT DOCUMENTS

| | | | | |
|---|---|---|---|---|
| 9,958,286 | B2* | 5/2018 | Ukai | G01C 21/3605 |
| 2014/0341434 | A1* | 11/2014 | Lin | G06T 7/337 |
| | | | | 382/104 |
| 2015/0145995 | A1* | 5/2015 | Shahraray | H04W 4/021 |
| | | | | 348/148 |
| 2018/0101736 | A1* | 4/2018 | Han | G08G 1/017 |

(Continued)

*Primary Examiner* — Nathnael Aynalem
(74) *Attorney, Agent, or Firm* — Snell & Wilmer LLP (57) ABSTRACT

Methods and systems for sharing image data between vehicles. The system includes an image sensor of a first vehicle configured to detect image data of an environment around the first vehicle as it traverses a road. The system also includes a transceiver of the first vehicle configured to communicate the detected image data. The system also includes a transceiver of a second vehicle configured to receive the detected image data. The system also includes a display screen of the second vehicle configured to display a view of the environment around the road based on the detected image data.

20 Claims, 5 Drawing Sheets

(56) References Cited

U.S. PATENT DOCUMENTS

2019/0049992 A1\* 2/2019 Riess ................. G08G 1/166
2020/0074735 A1\* 3/2020 Nowakowski .......... G06T 11/60

\* cited by examiner

CONNECTED CAMERA SYSTEM FOR VEHICLES

BACKGROUND

1. Field

This specification relates to a system and a method for providing image data from a first vehicle to a second vehicle.

2. Description of the Related Art

Vehicles may be used to transport an individual and/or cargo from one point to another. Vehicles may be used to travel to a workplace, a landmark, a restaurant, or a home, for example. While traveling using a vehicle, the vehicle may traverse roads with scenic views adjacent to the roads. The vehicle may also traverse roads that are difficult to navigate. These roads may have many features that make them difficult to navigate, such as twists and turns, narrow roads, unpaved roads, and changes in elevation. Conventional vehicles do not have a way of sharing the experience of traversing these roads. Thus, there is a need for improved vehicle systems.

SUMMARY

What is described is a system for sharing image data between vehicles. The system includes an image sensor of a first vehicle configured to detect image data of an environment around the first vehicle as it traverses a road. The system also includes a transceiver of the first vehicle configured to communicate the detected image data. The system also includes a transceiver of a second vehicle configured to receive the detected image data. The system also includes a display screen of the second vehicle configured to display a view of the environment around the road based on the detected image data.

Also described is a system for sharing image data between vehicles. The system includes a transceiver of a first vehicle configured to communicate a request for an image of the first vehicle at a location. The system also includes an image sensor of a second vehicle configured to detect image data of the first vehicle at the location. The system also includes a transceiver of the second vehicle configured to communicate the image data. The system also includes a remote data server. The remote data server is configured to receive the request for the image of the first vehicle at the location. The remote data server is also configured to communicate the request to the second vehicle. The remote data server is also configured to receive the image data from the second vehicle. The remote data server is also configured to communicate the image of the first vehicle at the location to the first vehicle.

Also described is a method for sharing image data between vehicles. The method includes detecting, by an image sensor of an image-taking vehicle, image data of an environment around the image-taking vehicle. The method includes communicating, by a transceiver of the image-taking vehicle, the detected image data. The method includes receiving, by a transceiver of an image-receiving vehicle or a transceiver of a mobile device, the detected image data. The method includes displaying, by a display screen of the image-receiving vehicle or a display screen of the mobile device, a view of the environment around the image-taking vehicle.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, and methods for sharing image data between vehicles. A driver of a vehicle may be traversing a road that is difficult to traverse due to various factors (e.g., twists and turns, narrow roads, unpaved roads, changes in elevation) and/or a road that has scenic views adjacent to the road. In some situations, the driver may wish to share the driver's experience with others. This sharing of the traversal of the road may be instructional (to inform other drivers how to safely traverse the road) or may be used for entertainment (to experience the vehicle's traversal of the road and/or viewing the scenic views). In addition, a driver of a vehicle may wish to have a picture taken of the vehicle at a scenic location or a landmark without exiting the vehicle or from a distant vantage point. However, the scenic location or landmark may be located such that it is not possible or not practical to do so.

Conventional vehicles are not capable of recording the vehicle's traversal of a road, capturing the scenic views adjacent to a road, or capturing images of another vehicle at a particular location. The systems and methods described herein use image sensors of vehicles to record the vehicle's traversal of a road, capture the scenic views adjacent to a road, and capture images of another vehicle at a particular location. In addition, the systems and methods described herein are capable of sharing the detected image and video to others.

By sharing an expert or local driver's traversal of a road, a subsequent driver may be better informed as to how to traverse the road. By sharing the scenic views adjacent to a road, a subsequent driver may not be tempted to view the scenic view while driving, knowing that the subsequent driver may view it at another time. By sharing an image of another vehicle at a scenic location or at a landmark with the other vehicle, the driver of the other vehicle may not be tempted to put themselves in a dangerous or precarious situation to attempt to take the picture. Each of these aspects improves the safety of the vehicle and the driver of the vehicle, as well as the overall safety of other drivers and their respective vehicles.

As used herein, "driver" may refer to a human being driving the vehicle when the vehicle is a non-autonomous vehicle, and/or "driver" may also refer to one or more computer processors used to autonomously or semi-autonomously drive the vehicle. "User" may be used to refer to the driver or occupant of the vehicle when the vehicle is a non-autonomous vehicle, and "user" may also be used to refer to an occupant of the vehicle when the vehicle is an autonomous or semi-autonomous vehicle.

Figure 1:
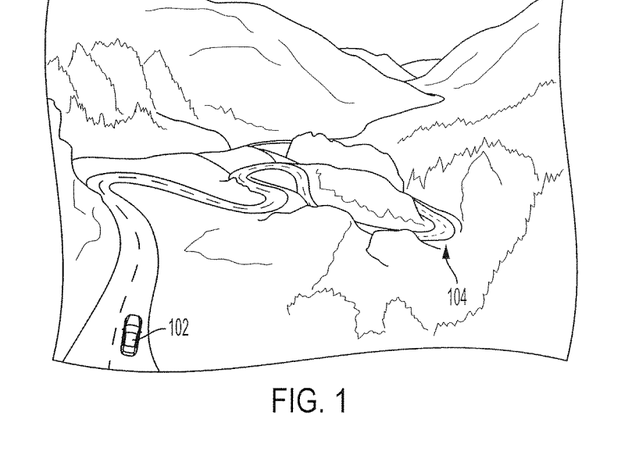
FIG. 1 illustrates a view of a vehicle traveling on a scenic route, according to various embodiments of the invention.

FIG. 1 illustrates a road 104 and a vehicle 102 travelling thereon. A driver of the vehicle 102 may be an experienced driver or a local who is familiar with the particular road 104. As shown in FIG. 1, the road 104 lies in a scenic area. In many situations, roads in scenic areas are windy or may be difficult to traverse. Thus, a driver traversing such a road for the first time may not be familiar with the road and the many maneuvers required to safely traverse the road. In addition, for sake of safety, the driver may not be able to view the scenic aspects of the road because the driver is concentrated on safely traversing the road 104.

Figure 2:
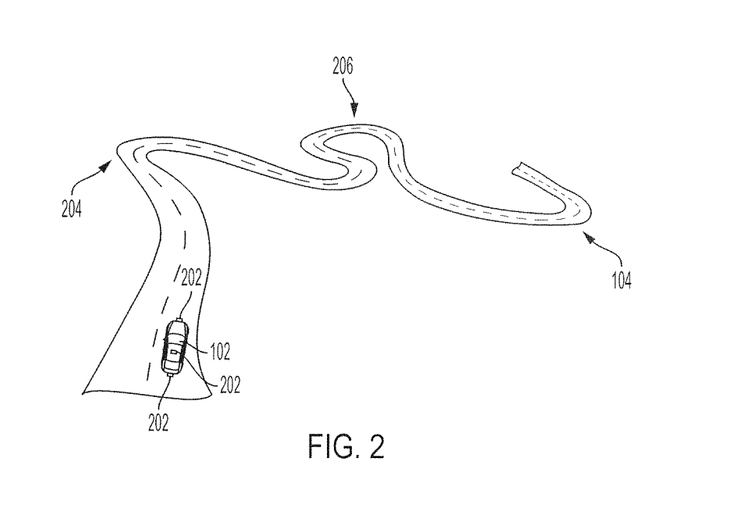
FIG. 2 illustrates the vehicle on the road of the scenic route, according to various embodiments of the invention.

FIG. 2 illustrates the road 104 and the vehicle 102. The experienced driver of the vehicle 102 may record the driver's traversal of the road 104 using one or more cameras 202 of the vehicle 102. In this way, the vehicle 102 may be referred to as an image-taking vehicle. The cameras 202 may be configured to detect image data in the form of video or still images. The cameras 202 may have a field of view of any degree (e.g., 35 degrees, 90 degrees, 180 degrees, 360 degrees) and may be positioned at any location on the vehicle 102, including the interior or exterior of the vehicle 102.

The cameras 202 of the vehicle 102 may capture image data as the vehicle 102 traverses various portions of the road 104, such as a first curve 204 and/or a second curve 206. The image data may capture the views in front of the vehicle 102, beside the vehicle 102, behind the vehicle 102, and any aspect therebetween.

The vehicle 102 may automatically instruct the cameras 202 to detect image data when a scenic area is reached. The vehicle 102 may have a memory with map data including identification of geographic locations (e.g., in GPS coordinates) where image data may be of interest. The vehicle 102 may instruct the cameras 202 to detect image data when prompted by a user of the vehicle 102. The user of the vehicle 102 may provide the prompting using an input unit (e.g., a touchscreen, button, microphone) of the vehicle 102.

Figure 3:
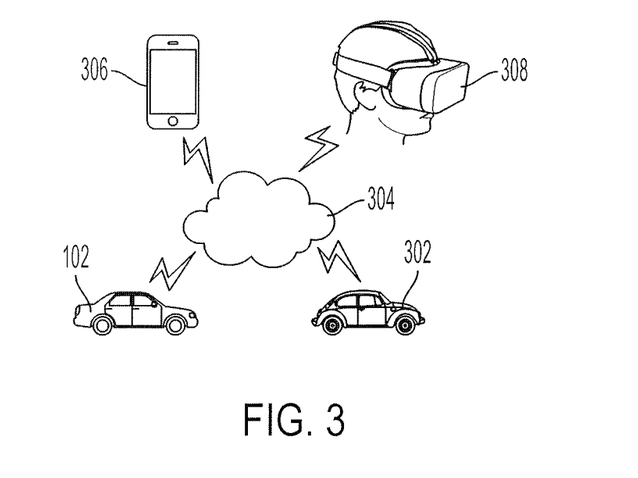
FIG. 3 illustrates a system for sharing image data detected by the vehicle, according to various embodiments of the invention.

Once the image data has been detected by the cameras 202 and recorded, the image data may be used by various devices. FIG. 3 illustrates the sharing of the image data recorded by the vehicle 102. The vehicle 102 may be communicatively coupled to a network 304 (e.g., the Internet) via one or more transceivers. The network 304 may be accessible to a plurality of other devices via respective transceivers.

A second vehicle 302 may be communicatively coupled to the network 304 and may receive the image data from the vehicle 102. The second vehicle 302 may display the image data detected by the cameras 202 of the vehicle 102 on one or more display screens within the second vehicle 302. In this way, the second vehicle 302 may be referred to as an image-receiving vehicle. The second vehicle 302 may also use the detected image data from the vehicle 102 as guidance for traversing the road 104. For example, the second vehicle 302 may detect various aspects of the vehicle 102 traversing the road 104 from analysis of the image data, such as a vehicle speed and vehicle turning. The second vehicle 302 may use these detected traversal aspects when the second vehicle 302 traverses the road 104. In some embodiments, the second vehicle 302 may use the detected aspects to autonomously maneuver and traverse the road 104. In some embodiments, the second vehicle 302 may provide alerts for the driver of the second vehicle 302 in anticipation of potentially dangerous portions of the road 104.

In some embodiments, the vehicle 102 also includes one or more sensors (e.g., IMU, accelerometer, steering wheel sensor, accelerator pedal sensor, brake pedal sensor, gyro, drivetrain sensor) for detecting the various operation aspects of the vehicle 102 while traversing the road 104. This vehicle sensor data may be coordinated with a location (e.g., geographic coordinates) of the vehicle 102 as the vehicle sensor data is detected. Thus, the vehicle sensor data may provide an accurate representation of the operation of the vehicle 102 as the vehicle 102 traverses the road 104.

This vehicle sensor data associated with the traversal of the road may be communicated along with the image data from the cameras 202. In some embodiments, the vehicle sensor data is communication without the image data. The second vehicle 302 may use the sensor data for autonomously maneuvering and traversing the road 104 and/or providing alerts for the driver of the second vehicle 302 in anticipation of potentially dangerous portions of the road 104. For example, the vehicle data may be coordinated with location data of the second vehicle 302 and the second vehicle 302 may mirror or mimic vehicle operations of the second vehicle 302 while traversing the road 104 autonomously using the vehicle sensor data from the vehicle 102.

A mobile device 306 (e.g., a smartphone, a tablet, a laptop) may be communicatively coupled to the network 304 and may receive the image data from the vehicle 102. The mobile device 306 may display the image data detected by the cameras 202 of the vehicle 102 on a display screen of the mobile device 306. In this way, a user of the mobile device 306 may view the perspective of the vehicle 102, for enjoyment to see the scenic views, or in preparation of traversing the road 104 at a future time.

A virtual reality (VR) headset 308 may be communicatively coupled to the network 304 and may receive the image data from the vehicle 102. The VR headset 308 may display the image data detected by the cameras 202 of the vehicle 102 on a display screen of the VR headset 308. The viewing perspective shown in the VR headset 308 may change based on a detected movement of the user of the VR headset 308. In this way, a user of the VR headset 308 may view the perspective of the vehicle 102, for enjoyment to see the scenic views, or in preparation of traversing the road 104 at a future time. The image data used by the VR headset 308 may come from a 360 degree camera of the vehicle 102 or may be a composite 360 degree view from various discrete image data from one or more vehicles (e.g., vehicle 102) detecting image data while traversing the road 104.

The image data from the vehicle 102 may be associated with a location tag such that when the subsequent vehicle is approaching the road 104 or has reached the road 104, the subsequent vehicle may notify a user of the subsequent vehicle.

Figure 4A:
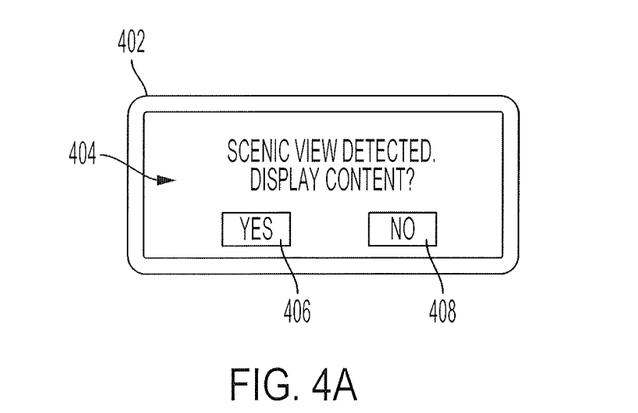
FIGS. 4A-4B illustrate views of a user interface showing recorded content, according to various embodiments of the invention.

FIG. 4A illustrates a display screen 402 of a subsequent vehicle (e.g., second vehicle 302 or image-receiving vehicle). The display screen 402 may be located at an instrument panel, a rear entertainment system, or an infotainment unit of the subsequent vehicle. The display screen 402 is configured to display a graphical user interface 404 rendered by a processor (e.g., ECU) of the subsequent vehicle. The graphical user interface 404 indicates that there is scenic view content associated with the location of the subsequent vehicle and asks whether the user would like to view the content. Respective icons for YES 406 and NO 408 are provided.

Figure 4B:
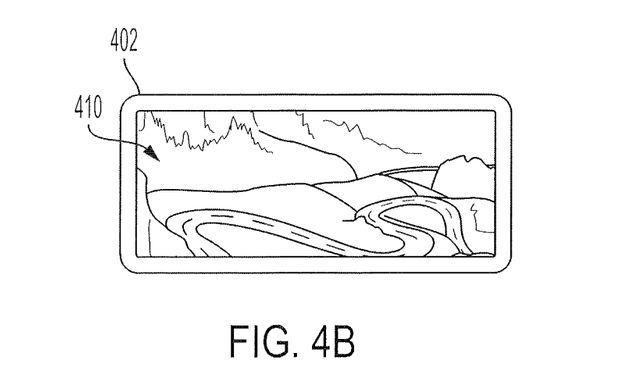

When the user engages the NO 408 icon, the interaction with the display screen 402 may end. FIG. 4B illustrates an example view when the YES 406 icon is engaged. The display screen 402 may show the scenic view 410 captured by the vehicle 102. Where there are multiple perspectives available from multiple cameras or a rotating camera of the vehicle 102, the user may be able to control the viewing perspective of the scenic view 410 using an input unit.

By providing the scenic view 410 via the display screen 402, viewers of the scenic view 410 within the vehicle may be able to experience a perspective that they are not able to view as they sit in the vehicle, due to limitations of the driver of the vehicle or limitations of the vehicle itself.

Where the subsequent vehicle uses the traversal aspects from the vehicle 102 to autonomously traverse the road 104 or to provide notifications to the driver of the subsequent vehicle as the driver traverses the road 104, there may be a notification to the driver that supplemental guidance from vehicle 102 is being used as the road 104 is traversed.

In addition to displaying the scenic view 410 when the vehicle is at the location of the scenic view 410, a user of the subsequent vehicle or a mobile device may be able to view the scenic view 410 on-demand. The scenic view 410 may be one of a plurality of scenic views for viewing by the user of the subsequent vehicle or a mobile device. The plurality of scenic views may be stored on a remote data server and accessible via a network (e.g., network 304). Each of the plurality of scenic views may be associated with various aspects of the views, such as the name of the driver who was driving the vehicle when the scenic view was captured, a time of day of the scenic view, or a difficulty of the traversed route, for example. The user may be able to select any of the plurality of scenic views for viewing, and the plurality of scenic views may be sorted and/or selected by the user.

Figure 5A:
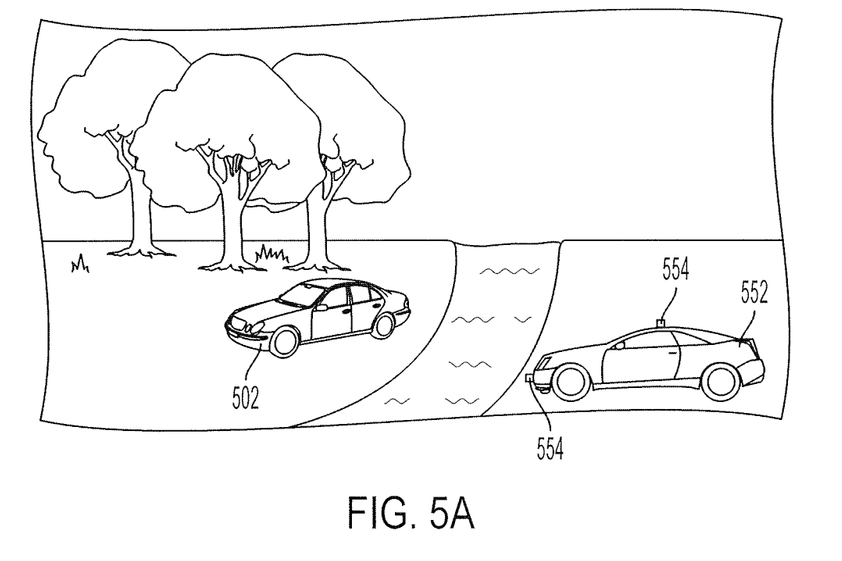
FIGS. 5A-5B illustrate using cameras of other vehicles, according to various embodiments of the invention.
Figure 5B:
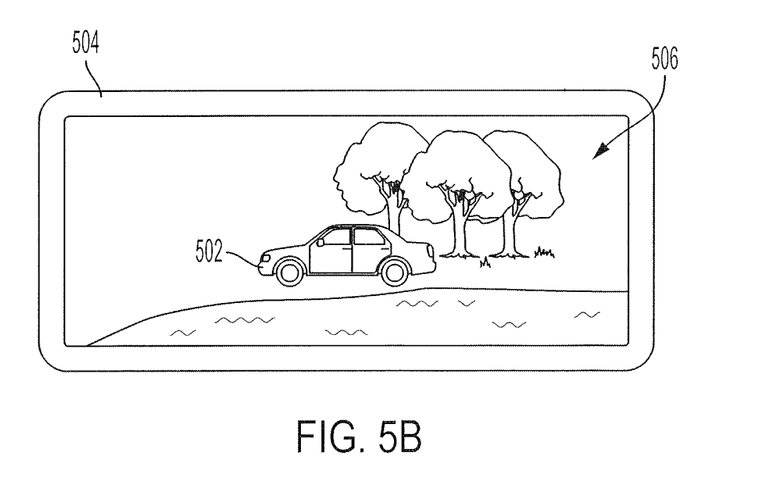

In addition to sharing views of traversal of a road, the system described herein may also be used to obtain images of a vehicle from another vehicle's perspective. This aspect is illustrated in FIGS. 5A-5B. The first vehicle 502 is located in a scenic area, and would like for a picture to be taken of the first vehicle 502 with the scenic area around the first vehicle 502. In many situations, it may not be safe or practical for the user of the first vehicle 502 to exit the first vehicle 502 and position themselves at a location for taking a picture of the first vehicle 502.

In FIG. 5A, the river serves as an obstacle for the user exiting the first vehicle 502 to take a picture of the first vehicle 502 amidst the trees. However, in other situations, for example where the background includes a monument located in a high-traffic area and parking the first vehicle 502 is impractical, there may be other obstacles.

In such situations, a second vehicle 552 may include one or more cameras 554. The cameras 554 may be similar to the cameras 202 of the vehicle 102. The cameras 554 may detect image data of the first vehicle 502 with the scenic background. The image data may be sent to the first vehicle 502 and/or may be stored on a remote data server for accessing by one or more devices (e.g., mobile devices or vehicles). In this way, the first vehicle 502 may be referred to as an image-receiving vehicle or an image-requesting vehicle and the second vehicle 552 may be referred to as an image-taking vehicle.

FIG. 5B illustrates a display screen 504 showing the image 506 of the first vehicle 502, taken by the cameras 554 of the second vehicle 552. The display screen 504 may be a display screen of the first vehicle 502, a display screen of a mobile device (e.g., mobile device 306) or any other network-connected device.

By having the second vehicle 552 detect the image data of the first vehicle 502, the user of the first vehicle 502 may safely obtain an image of the first vehicle 502. In some embodiments, the user of the first vehicle 502 may exit the vehicle where it is safe to do so, and may also be in the image captured by the second vehicle 552.

Figure 6A:
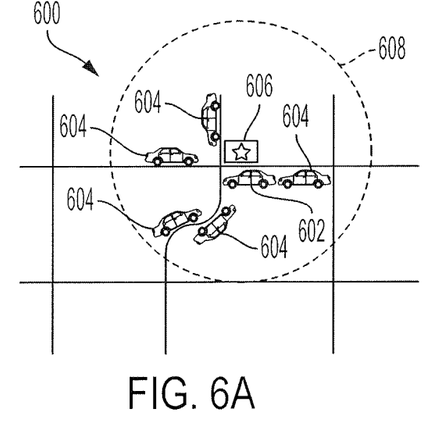
FIGS. 6A-6B illustrate identification of other vehicles, according to various embodiments of the invention.

FIG. 6A illustrates a map 600 showing a point of interest 606 that a first vehicle 602 (e.g., first vehicle 502 or image-receiving vehicle or image-requesting vehicle) would like its picture taken with, by one or more second vehicles 604 (e.g., second vehicle 552 or image-taking vehicle).

The first vehicle 602 may receive, from a user of the first vehicle 602, an identification of the point of interest 606. The identification may be received via an input unit (e.g., touchscreen, buttons, microphone) of the first vehicle 602. The first vehicle 602 may communicate a request to a remote data server for a picture, and the request may include the identification of the point of interest 606. The identification of the point of interest 606 may be associated with geographic coordinates (e.g., GPS coordinates) and these geographic coordinates may be obtained by the first vehicle 602 or by the remote data server.

The remote data server may then communicate to the plurality of second vehicles 604, the request for the picture, including identifying information of the first vehicle 602 and/or the location of the point of interest 606. The identifying information may include physical characteristics of the first vehicle 602 (e.g., make, model, color, vehicle type) and/or identifiers of the first vehicle 602 (e.g., a license plate number).

The plurality of second vehicles 604 may then take one or more pictures of the first vehicle 602 when the first vehicle 602 is in proximity of the point of interest 606. As used herein, proximity of the point of interest 606 may refer to a spatial relationship with the point of interest whereby the first vehicle and the point of interest may be captured in a picture.

The remote data server may determine the plurality of second vehicles 604 based on their location relative to a boundary 608 around the point of interest 606. Vehicles within this boundary 608 may be identified as second vehicles 604 when they are in proximity of the point of interest 606 and the first vehicle 602 at the same time when the first vehicle 602 is in proximity of the point of interest 606. These second vehicles 604 may receive an instruction to detect image data using one or more onboard cameras. These second vehicles 604 may detect image data and the remote data server or other computing device may identify the first vehicle 602 within the pictures and save those pictures. Thus, the remote data server or other computing device may receive a large amount of image data and may be tasked with determining which subset of the image data includes the first vehicle 602 and the point of interest 606. Artificial intelligence and/or machine learning techniques may be used to identify the first vehicle 602 and the point of interest 606, as well as evaluating a quality of the image. The quality of the image may be affected by various factors, including whether the first vehicle 602 is in focus or whether the first vehicle 602 and/or the point of interest 606 are located in the center of the image, for example.

Alternatively or in addition, the second vehicles 604 may identify the first vehicle 602 and the point of interest 606 based on one or more characteristics of the first vehicle 602 (e.g., a make, model, color) and the point of interest 606 (e.g., based on structural characteristics, street name and number, signs) and the second vehicles 604 may then take pictures of the first vehicle 602 and the point of interest 606. Thus, the remote data server or other computing device may only receive from the second vehicles 604 image data that includes the first vehicle 602 and the point of interest 606.

Figure 6B:
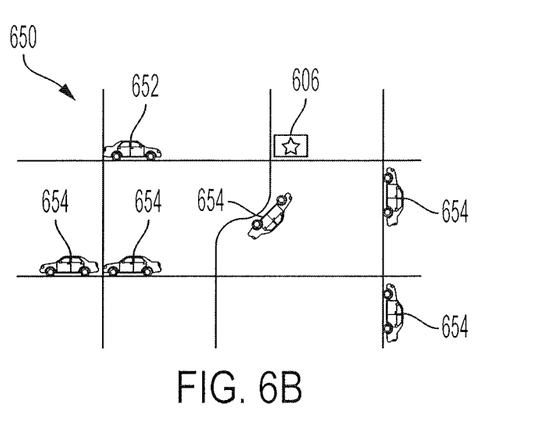

FIG. 6B illustrates a map 650 showing a point of interest 606 that a first vehicle 652 (e.g., first vehicle 502 or image-receiving vehicle or image-requesting vehicle) is approaching and would like its picture taken with, by one or more second vehicles 654 (e.g., second vehicle 552 or image-taking vehicle).

The first vehicle 652 may receive, from a user of the first vehicle 652, an identification of the point of interest 606. The identification may be received via an input unit (e.g., touchscreen, buttons, microphone) of the first vehicle 652. The first vehicle 652 may communicate a request to a remote data server for a picture, and the request may include the identification of the point of interest 606. The identification of the point of interest 606 may be associated with geographic coordinates (e.g., GPS coordinates) and these geographic coordinates may be obtained by the first vehicle 652 or by the remote data server.

The remote data server may then communicate to the plurality of second vehicles 654, the request for the picture, including identifying information of the first vehicle 652 and/or the location of the point of interest 606. The identifying information may include physical characteristics of the first vehicle 652 (e.g., make, model, color) and/or identifiers of the first vehicle 652 (e.g., a license plate number).

The plurality of second vehicles 654 may then take one or more pictures of the first vehicle 652 when the first vehicle 652 is in proximity of the point of interest 606. The second vehicles 654 may be identified based on an anticipated location of the second vehicles 654 when the first vehicle 652 is expected to be in proximity of the point of interest 606.

A time that the first vehicle 652 will be in proximity of the point of interest 606 may be determined and provided by the first vehicle 652 and/or the remote data server to the second vehicles 654. Where the first vehicle 652 determines the time that the first vehicle 652 will be in proximity of the point of interest 606, the first vehicle 652 may use a current location of the first vehicle along with traffic data and navigation data to determine the time that the first vehicle 652 will be in proximity of the point of interest 606. Where the remote data server determines the time that the first vehicle 652 will be in proximity of the point of interest 606, the remote data server may receive the current location of the first vehicle 652 from the first vehicle 652 (e.g., at the time of the request being sent from the first vehicle or at a later time) and the remote data server may use the location data of the first vehicle along with traffic data and navigation data to determine the time that the first vehicle 652 will be in proximity of the point of interest 606.

The determined time may be used to identify the second vehicles 654 to send the request to. One or more second vehicles 654 may be identified from a pool of potential vehicles. The identification of the one or more second vehicles 654 may be made based on the current location, a known current destination, known driving patterns, and/or current routes for each of the potential vehicles, in order to determine the anticipated location of the second vehicles 654 when the first vehicle 652 is in proximity of the point of interest 606.

In the systems and methods described herein, the taking of pictures by cameras of the second vehicle (e.g., second vehicle 552, 604, 654) may be done without the driver or any occupants of the second vehicle being alerted. Thus, the system may be a passive system of sharing image data. In some embodiments, the owner or user of the second vehicle may give consent to participate in the sharing of image data detected by the cameras of the second vehicle. In some embodiments, the image data detected by the cameras of the second vehicle may be automatically deleted from local memory of the second vehicle after the image data is communicated to a remote data server for sending to the first vehicle (e.g., first vehicle 502, 602, 652). In some embodiments, the image data is sent directly from the second vehicle to the first vehicle using a vehicle-to-vehicle (V2V) communication protocol when the second vehicle is in proximity to the first vehicle.

Figure 7:
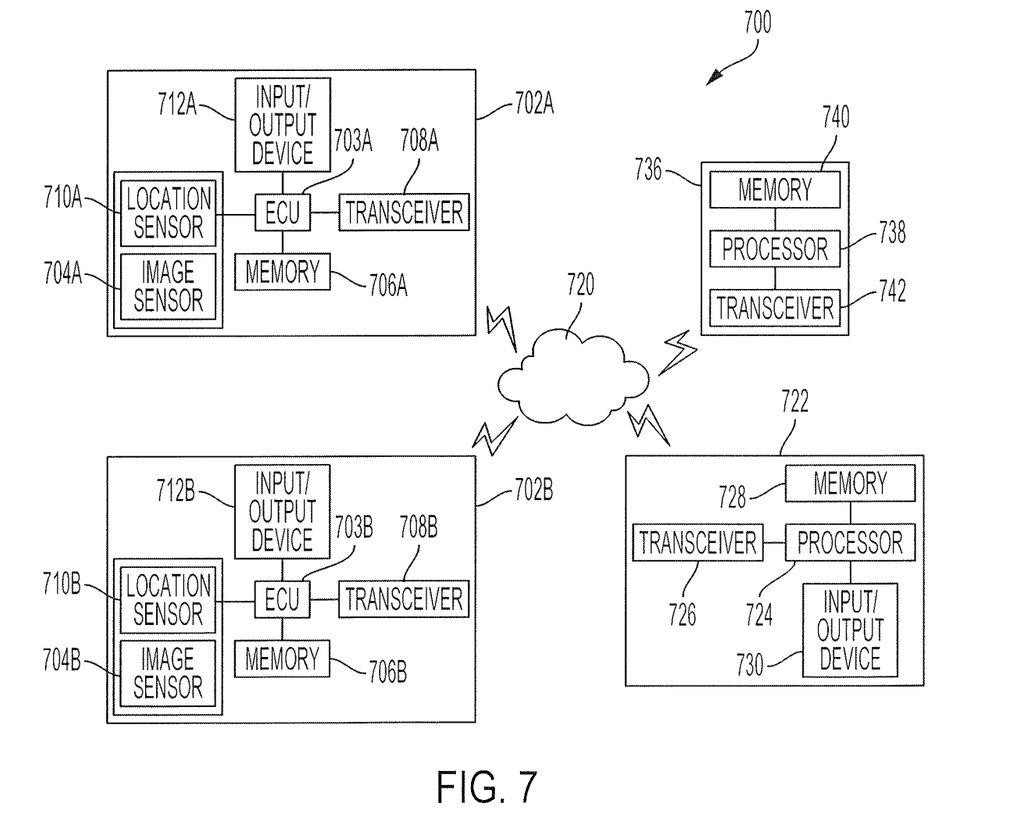
FIG. 7 illustrates a block diagram of components of the system, according to various embodiments of the invention.

FIG. 7 illustrates a system 700. The system 700 includes a first vehicle 702A, a second vehicle 702B, a remote data server 736, and a mobile device 722. Components having a letter suffix may be referred to collectively or individually by the number before the letter suffix. For example, vehicle 702 may refer to the first vehicle 702A and the second vehicle 702B collectively or may refer to either the first vehicle 702A or the second vehicle 702B individually. The vehicles 702 may be similar to any of the vehicles described herein, such as vehicles 102, 302, 502, 552, 602, 604, 652, 654.

The vehicle 702 may have an automatic or manual transmission. The vehicle 702 is a conveyance capable of transporting a person, an object, or a permanently or temporarily affixed apparatus. The vehicle 702 may be a self-propelled wheeled conveyance, such as a car, sports utility vehicle, truck, bus, van or other motor or battery driven vehicle. For example, the vehicle 702 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation.

The vehicle 702 may be capable of non-autonomous operation or semi-autonomous operation or autonomous operation. That is, the vehicle 702 may be driven by a human driver or may be capable of self-maneuvering and navigating without human input. A vehicle operating semi-autonomously or autonomously may use one or more sensors and/or a navigation unit to drive autonomously.

The vehicle 702 includes an ECU 703 (e.g., ECU 703A and 703B) connected to a transceiver 708 (e.g., 708A and 708B), input/output device 712 (e.g., 712A and 712B), a memory 706 (e.g., 706A and 706B), a location sensor 710 (e.g., 710A and 710B), an image sensor 704 (e.g., 704A and 704B). The ECU 703 may be one or more ECUs, appropriately programmed, to control one or more operations of the vehicle. The one or more ECUs 703 may be implemented as a single ECU or in multiple ECUs. The ECU 703 may be electrically coupled to some or all of the components of the vehicle. In some embodiments, the ECU 703 is a central ECU configured to control one or more operations of the entire vehicle. In some embodiments, the ECU 703 is multiple ECUs located within the vehicle and each configured to control one or more local operations of the vehicle. In some embodiments, the ECU 703 is one or more computer processors or controllers configured to execute instructions stored in a non-transitory memory 706. All of the elements of the vehicle 702 may be connected via a communications bus.

As described herein, the image sensors 704 (e.g., cameras 202, 554) are configured to detect image data of the environment outside of the vehicle 702. The image sensors 704 may have a field of view of any degree (e.g., 35 degrees, 90 degrees, 180 degrees, 360 degrees) and may be positioned at any location on the vehicle 102, including the interior or exterior of the vehicle 702. The image sensors 704 may automatically detect image data continuously or as instructed by the ECU 703.

The location sensor 710 is configured to detect location data. The location sensor 710 may be a GPS unit or any other device for determining the location of the vehicle 702. The ECU 703 may use the location data along with the map data stored in memory 706 to determine a location of the vehicle. In some embodiments, the location sensor 710 has access to the map data and may determine the location of the vehicle and provide the location of the vehicle to the ECU 703.

The input/output device 712 is configured to receive inputs from the user, such as an address to navigate to, a request for pictures to be taken at a point of interest, or for accessing video or images taken by another vehicle, as described herein. The input/output device 712 may include a touchscreen display, a microphone, a keypad, a camera for detecting gestures, and/or one or more buttons or dials, for example. The input/output device 712 is also configured to provide outputs to the user, such as navigation directions. The input/output device 712 may include a display screen, a heads-up display unit, a speaker, or a vibration unit, for example. The input/output device 712 may include multiple devices and units working together and being instructed by the ECU 703 to receive user input and provide an output to the user.

The memory 706 is connected to the ECU 703 and may be connected to any other component of the vehicle. The memory 706 is configured to store any data described herein, such as the image data, the map data, the location data, or any data received from the remote data server 736, another vehicle 702, or mobile device 722 via the transceiver 708.

The vehicle 702 may be coupled to a network 720. The network 720, such as a local area network (LAN), a wide area network (WAN), a cellular network, a digital short-range communication (DSRC), LORA (Long Range), the Internet, or any other type of interconnectivity or combinations thereof, connects the vehicle 702 to other vehicles 702, the remote data server 736 and/or the mobile device 722.

The transceiver 708 may include a communication port or channel, such as one or more of a Wi-Fi unit, a Bluetooth® unit, a Radio Frequency Identification (RFID) tag or reader, a DSRC unit, a LORA unit, or a cellular network unit for accessing a cellular network (such as 3G, 4G, or 5G) or any other wireless technology. The transceiver 708 may transmit data to and receive data from devices and systems not physically connected to the vehicle. For example, the ECU 703 may communicate with the remote data server 736. Furthermore, the transceiver 708 may access the network 720, to which the remote data server 736 is also connected.

The ECU 703A of a first vehicle 702A may detect and store image data using the image sensor 704A as the first vehicle 702A traverses a road, as described herein with respect to FIGS. 1 and 2. The image data may be pictures or video showing the first vehicle 702A traversing the road and may also show the scenic environment around the first vehicle 702A.

The image data may be communicated away from the first vehicle 702A using the transceiver 708A. The image data may be received by a second vehicle 702B, either via network 720 or directly (e.g., using a vehicle-to-vehicle communication protocol). The image data may be received by a remote data server 736 which may then send the image data to other vehicles or computing devices. The image data may be received by a mobile device 722 (e.g., a smartphone, tablet, laptop, VR headset) for viewing.

As described herein, the second vehicle 702B may use the image data and any other traversal aspects detected by the first vehicle 702A (e.g., inertial data from an IMU, acceleration data from an accelerometer, vehicle speed data from a speed sensor, steering data from a steering wheel sensor, driver acceleration data from an accelerator pedal sensor, and/or braking data from a brake pedal sensor) to assist the second vehicle 702B in autonomously driving across the road filmed by the first vehicle 702A.

The ECU 703A of the first vehicle 702A may also receive a request from a user of the first vehicle 702A (e.g., first vehicle 502, 602), an identification of a point of interest (e.g., point of interest 606). The identification may be received via the input/output device 712A. The first vehicle 702A may communicate a request to the remote data server 736 for a picture, and the request may include the identification of the point of interest.

The remote data server 736 may then communicate to one or more second vehicles 702B (e.g., second vehicle 552, 604), the request for the picture, including identifying information of the first vehicle 702A and/or the location of the point of interest. The identifying information may include physical characteristics of the first vehicle 702A (e.g., make, model, color) and/or identifiers of the first vehicle 702A (e.g., a license plate number).

The one or more second vehicles 702B may then take one or more pictures of the first vehicle 702A when the first vehicle 702A is in proximity of the point of interest. The remote data server 736 may determine the one or more second vehicles 702B based on their location relative to a boundary around the point of interest. The one or more second vehicles 702B may continuously or periodically send location data detected by the location sensor 710B to the remote data server 736.

A second vehicle 702B within this boundary may receive an instruction to detect image data using one or more onboard cameras. In some embodiments, the second vehicle 702B may detect image data and send the image data to the remote data server 736 or other computing device to identify the first vehicle 702A within the pictures and save those pictures. In some embodiments, the second vehicle 702B may identify the first vehicle 702A and the point of interest based on one or more characteristics of the first vehicle 702A (e.g., a make, model, color) and the point of interest (e.g., based on structural characteristics, street name and number, signs) and the second vehicle 702B may then take pictures of the first vehicle 702A and the point of interest.

In some embodiments, the second vehicle 702B may be identified ahead of time, in anticipation of the first vehicle 702A and the second vehicle 702B being in proximity of the point of interest at a similar time.

After the ECU 703A of the first vehicle 702A (e.g., first vehicle 652) receives, from a user of the first vehicle 702A, an identification of the point of interest, the first vehicle 702A may communicate a request to a remote data server for a picture along with the identification of the point of interest.

A time that the first vehicle 702A will be in proximity of the point of interest may be determined and provided by the first vehicle 702A and/or the remote data server 736 to the one or more second vehicles 702B. Where the first vehicle 702A determines the time that the first vehicle 702A will be in proximity of the point of interest, the first vehicle 702A may use a current location of the first vehicle along with traffic data and navigation data to determine the time that the first vehicle 702A will be in proximity of the point of interest. Where the remote data server 736 determines the time that the first vehicle 702A will be in proximity of the point of interest, the remote data server 736 may receive the current location of the first vehicle 702A from the first vehicle 702A (e.g., at the time of the request being sent from the first vehicle or at a later time) and the remote data server 736 may use the location data of the first vehicle along with traffic data and navigation data to determine the time that the first vehicle 702A will be in proximity of the point of interest.

The determined time may be used to identify the one or more second vehicles 702B (e.g., second vehicles 654) to send the request to. One or more second vehicles 702B may be identified from a pool of potential vehicles. The identification of the one or more second vehicles 702B may be made based on the current location, a known current destination, known driving patterns, and/or current routes for each of the potential vehicles, in order to determine the anticipated location of the second vehicles 702B when the first vehicle 702A is in proximity of the point of interest.

The remote data server 736 may then communicate to one or more second vehicles 702B, the request for the picture, including identifying information of the first vehicle 702A and/or the location of the point of interest. The one or more second vehicles 702B may then take one or more pictures of the first vehicle 702A when the first vehicle 702A is in proximity of the point of interest.

The remote data server 736 may include a non-transitory memory 740, a processor 438 configured to execute instructions stored in the non-transitory memory 740, and a transceiver 442 configured to transmit and receive data to and from other devices, such as vehicle 702. The remote data server 736 may be one or more servers from different service providers. Each of the one or more servers may be connected to one or more databases. A service provider may provide data to the vehicle, such as navigational map, weather and/or traffic data, for example.

A database is any collection of pieces of information that is organized for search and retrieval, such as by a computer or a server, and the database may be organized in tables, schemas, queries, report, or any other data structures. A database may use any number of database management systems and may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name.

Also included in the system is a mobile device 722 (e.g., mobile device 306), which includes a processor 724 configured to execute instructions stored in non-transitory memory 728. The mobile device 722 also includes a transceiver 726 similar to transceiver 708 and transceiver 742. The mobile device 722 also includes an input/output device 730 configured to receive inputs from the user and display outputs to the user, as described herein. The input/output device 730 may be an input device (or input unit) such as a touchscreen, a microphone, a stylus, or a keyboard and an output device (or output unit) such as a touchscreen, a display screen, or a speaker. As described herein, the mobile device 722 may be used to provide image data to the user about the image data detected by the vehicle 702 during traversal of a road.

Also included in the system is a remote data server 736 which includes a processor 738 configured to execute instructions stored in non-transitory memory 740. The remote data server 736 also includes a transceiver 742 similar to transceiver 708 and transceiver 726. The remote data server 736 may facilitate communication between vehicles 702, including communication of image data. The remote data server 736 may also coordinate requests for images from a first vehicle 702A and the fulfillment and delivery of those requested images by one or more second vehicles 702B, as described herein. The remote data server 736 may also store detected image data from a first vehicle 702A taken during the first vehicle's traversal of a road, such that other devices (e.g., second vehicle 702B and mobile device 722) may later view the detected image data. The remote data server 736 may collect detected image data from a plurality of vehicles (e.g., vehicle 102, 702) and generate a composite 360-degree view of the environment around the traversed road, for viewing by another device. The remote data server 736 may use machine learning or artificial intelligence techniques to combine the images into the composite 360-degree view.

While only two vehicles 702A-702B are shown, any number of vehicles may be used. Likewise, while only one remote data server 736 is shown, any number of remote data servers in communication with each other may be used. Multiple remote data servers may be used to increase the memory capacity of the data being stored across the remote data servers, or to increase the computing efficiency of the remote data servers by distributing the computing load across the multiple remote data servers. Multiple remote data servers may be interconnected using any type of network, or the Internet.

As used herein, a "unit" may refer to hardware components, such as one or more computer processors, controllers, or computing devices configured to execute instructions stored in a non-transitory memory.

Figure 8:
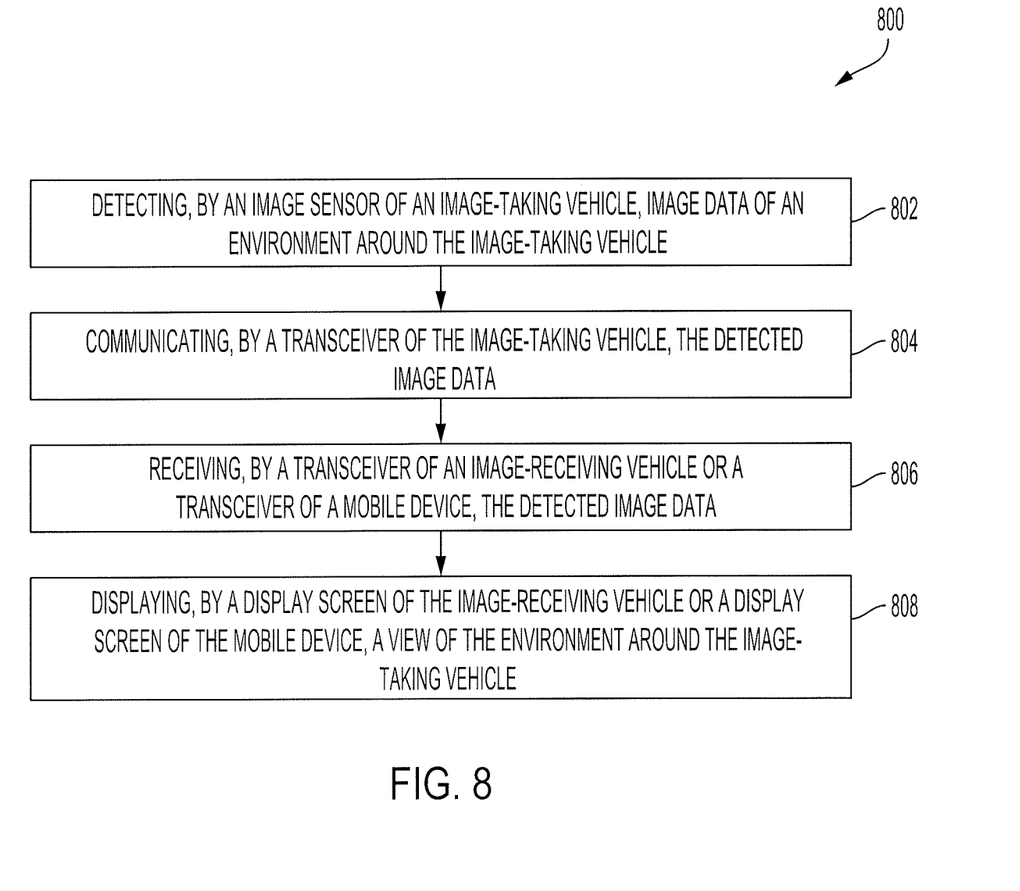
FIG. 8 illustrates a process of the system, according to various embodiments of the invention.

FIG. 8 illustrates a process 800 performed by the system described herein. The process 800 is for sharing image data between vehicles.

An image sensor (e.g., image sensor 704) of an image-taking vehicle (e.g., vehicle 102, 552) detects image data of an environment around the image-taking vehicle (step 802). The image data may be in the form of a still image or a video. The image sensor may be oriented outward on the image-taking vehicle and configured to detect image data in any field of view (e.g., 35 degrees field of view, 70 degrees, 90 degrees, 180 degrees, 360 degrees).

As shown in FIGS. 1 and 2 and described herein, the image data of the environment around the image-taking vehicle may be a view of the environment around a road being traversed by the image-taking vehicle. As shown in FIGS. 5A and 5B, the image data of the environment around the image-taking vehicle may include an image-requesting vehicle or image-receiving vehicle (e.g., vehicle 502).

The image-receiving vehicle (or image-requesting vehicle) may communicate, using a transceiver (e.g., transceiver 708), a request for an image of the image-receiving vehicle at a location, when image-taking vehicle is in proximity of the location and the view of the environment around the image-taking vehicle includes the image-receiving vehicle.

A transceiver (e.g., transceiver 708) of the image-taking vehicle communicates the detected image data (step 804) and the transceiver of the image-receiving vehicle or a transceiver (e.g., transceiver 726) of a mobile device receives the image data (step 806). The image data may be communicated directly from the image-taking vehicle to the image-receiving vehicle using a vehicle-to-vehicle communication protocol, for example. Alternatively or in addition, the image data may be communicated from the image-taking vehicle to the image-receiving vehicle using a remote data server (e.g., remote data server 736) whereby the image-taking vehicle uploads the image data to the remote data server and the image-receiving vehicle obtains the image data from the remote data server. The mobile device (e.g., mobile device 306, 722) may obtain the image data from the image-taking vehicle, either directly from the image-taking vehicle or from the remote data server.

A display screen of the image-receiving vehicle or the mobile device displays a view of the environment around the image-taking vehicle (step 808). The view of the environment around the image-taking vehicle may be scenery of a road the image-taking vehicle traverses. The view of the environment around the image-taking vehicle may include the image-receiving vehicle, and may optionally include a point of interest.

The image-receiving vehicle (or image-requesting vehicle) may receive, from a user of the image-receiving vehicle, an identification of the point of interest (e.g., point of interest 606). The identification may be received via an input unit (e.g., input/output device 712) of the image-receiving vehicle. The image-receiving vehicle may communicate a request to a remote data server for a picture, and the request may include the identification of the point of interest. The identification of the point of interest may be associated with geographic coordinates (e.g., GPS coordinates) and these geographic coordinates may be obtained by the image-receiving vehicle or by the remote data server.

The remote data server may then communicate to a plurality of image-taking vehicles, the request for the picture, including identifying information of the image-receiving vehicle and/or the location of the point of interest. The identifying information may include physical characteristics of the image-receiving vehicle (e.g., make, model, color, vehicle type) and/or identifiers of the image-receiving vehicle (e.g., a license plate number). The plurality of image-taking vehicles may then take one or more pictures of the image-receiving vehicle when the image-receiving vehicle is in proximity of the point of interest.

The remote data server may determine the plurality of image-taking vehicles based on their location relative to a boundary around the point of interest. Vehicles within this boundary may be the image-taking vehicles when they are in proximity of the point of interest and the image-receiving vehicle at the same time when the image-receiving vehicle is in proximity of the point of interest. These image-taking vehicles may receive an instruction to detect image data using one or more onboard cameras. These image-taking vehicles may detect image data and the remote data server or other computing device may identify the image-receiving vehicle within the pictures and save those pictures. Artificial intelligence and/or machine learning techniques may be used to identify the image-receiving vehicle and the point of interest, as well as evaluating a quality of the image.

Alternatively or in addition, the image-taking vehicles may identify the image-receiving vehicle and the point of interest based on one or more characteristics of the image-receiving vehicle and the point of interest and the image-taking vehicles may then take pictures of the image-receiving vehicle and the point of interest.

In some embodiments, the image-taking vehicles may be identified based on an anticipated location of the image-taking vehicles when the image-receiving vehicle is expected to be in proximity of the point of interest. A time that the image-receiving vehicle will be in proximity of the point of interest may be determined and provided by the image-receiving vehicle and/or the remote data server to the image-taking vehicles.

The determined time may be used to identify the image-taking vehicles to send the request to. One or more image-taking vehicles may be identified from a pool of potential vehicles. The identification of the one or more image-taking vehicles may be made based on the current location, a known current destination, known driving patterns, and/or current routes for each of the potential vehicles, in order to determine the anticipated location of the image-taking vehicles when the image-receiving vehicle is in proximity of the point of interest.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for sharing image data between vehicles, the system comprising:
   an image sensor on a first vehicle configured to detect image data of an environment around the first vehicle as the first vehicle traverses a road;
   a transceiver on the first vehicle configured to communicate the detected image data and associated attribute data including driver information of the first vehicle associated with the traversal of the road;
   a transceiver on a second vehicle configured to receive the detected image data based on the associated attribute data matching requested attribute data included in a user request from a user of the second vehicle; and
   a display screen on the second vehicle configured to display the detected image data.

2. The system of claim 1, further comprising a mobile device configured to receive the detected image data via a transceiver on the mobile device and display the detected image data via a display screen on the mobile device.

3. The system of claim 1, wherein the detected image data includes image data with a 360-degree field of view, and
   wherein the system further comprises an electronic control unit (ECU) on the second vehicle configured to dynamically render the detected image data for display on the display screen on the second vehicle based on an input from the user of a viewing perspective.

4. The system of claim 1, further comprising:
   a location sensor on the first vehicle configured to detect location data associated with the detected image data;
   a location sensor on the second vehicle configured to detect location data of the second vehicle; and
   an electronic control unit (ECU) on the second vehicle configured to instruct the display screen to display the detected image data based on the location data of the second vehicle and the location data associated with the detected image data.

5. The system of claim 1, further comprising a remote data server configured to receive, from a plurality of vehicles, image data of environment around the plurality of respective vehicles detected as the plurality of respective vehicles traversed the road.

6. The system of claim 5, wherein the remote data server is further configured to generate composite image data of a composite view of environment around the road based on the image data from the plurality of vehicles.

7. The system of claim 1, further comprising:
one or more vehicle sensors on the first vehicle configured to detect vehicle sensor data of the first vehicle as the first vehicle traverses the road; and
an electronic control unit (ECU) on the second vehicle configured to autonomously maneuver the second vehicle along the road based on the vehicle sensor data from the first vehicle.

8. A system for sharing image data between vehicles, the system comprising:
a transceiver on a first vehicle configured to communicate a request for an image of the first vehicle at a location to be captured by an image sensor on a second vehicle, the request including attribute data including driver information of the second vehicle;
a transceiver on the second vehicle configured to communicate image data of the image of the first vehicle at the location captured by the image sensor on the second vehicle; and
a remote data server configured to:
receive the request from the first vehicle for the image of the first vehicle at the location,
communicate the request from the first vehicle to the second vehicle based on the request from the first vehicle including the attribute data including the driver information of the second vehicle,
receive the image data of the image of the first vehicle at the location from the second vehicle, and
communicate the image data of the image of the first vehicle at the location to the first vehicle based on the request from the first vehicle including the attribute data including the driver information of the second vehicle.

9. The system of claim 8, wherein the location includes a point of interest, and
wherein the system further comprises an input unit configured to receive, from a user of the first vehicle, an identification of the point of interest.

10. The system of claim 9, wherein the remote data server is further configured to identify the second vehicle from a plurality of possible vehicles.

11. The system of claim 10, wherein the identification of the second vehicle is based on a location of the second vehicle, a location of the first vehicle, and the location of the point of interest.

12. The system of claim 10, wherein the identification of the second vehicle is based on an anticipated location of the second vehicle and an anticipated location of the first vehicle at a particular time.

13. The system of claim 8, wherein the second vehicle is configured to identify the first vehicle based on one or more characteristics of the first vehicle and detect the image data of the image of the first vehicle at the location based on the identification of the first vehicle.

14. The system of claim 13, wherein the one or more characteristics include a license plate number of the first vehicle.

15. The system of claim 13, wherein the one or more characteristics include a physical aspect of the first vehicle including at least one of a make, a model, a color, or a vehicle type.

16. The system of claim 8, wherein the remote data server is further configured to identify the first vehicle from the image data received from the second vehicle.

17. The system of claim 8, wherein the remote data server is further configured to receive additional image data of the first vehicle at the location from a plurality of additional vehicles.

18. A method for sharing image data between vehicles, the method comprising:
detecting, by an image sensor on an image-taking vehicle, image data of an environment around the image-taking vehicle as the image-taking vehicle traverses a road;
communicating, by a transceiver on the image-taking vehicle, the detected image data and associated attribute data including driver information of the image-taking vehicle associated with the traversal of the road;
receiving, by a transceiver on an image-receiving vehicle or a transceiver on a mobile device, the detected image data based on the associated attribute data matching requested attribute data included in a user request from a user of the image-receiving vehicle or the mobile device;
and displaying, by a display screen on the image-receiving vehicle or a display screen on the mobile device, a view of the environment around the image-taking vehicle based on the detected image data.

19. The method of claim 18, wherein the environment around the image-taking vehicle includes a road traversed by the image-taking vehicle and the view of the environment around the image-taking vehicle includes scenery adjacent to the road.

20. The method of claim 18, further comprising:
communicating, by the transceiver on the image-receiving vehicle, a request for an image of the image-receiving vehicle at a location, the request including the requested attribute data including the driver information of the image-taking vehicle, the view of the environment around the image-taking vehicle being at the location and including the image-receiving vehicle;
receiving, by a remote data server, the request for the image of the image-receiving vehicle at the location;
communicating, by the remote data server, the request to the image-taking vehicle based on the associated attribute data from the image-taking vehicle matching the requested attribute data included in the user request from the user of the image-receiving vehicle or the mobile device;
receiving, by the remote data server, the detected image data from the image-taking vehicle; and
communicating, by the remote data server, the image of the image-receiving vehicle at the location to the image-receiving vehicle based on the associated attribute data from the image-taking vehicle matching the requested attribute data included in the user request from the user of the image-receiving vehicle or the mobile device.

* * * * *